(No Model.)
G. M. NAUMANN.
LAWN SHEARS.
No. 362,104. Patented May 3, 1887.
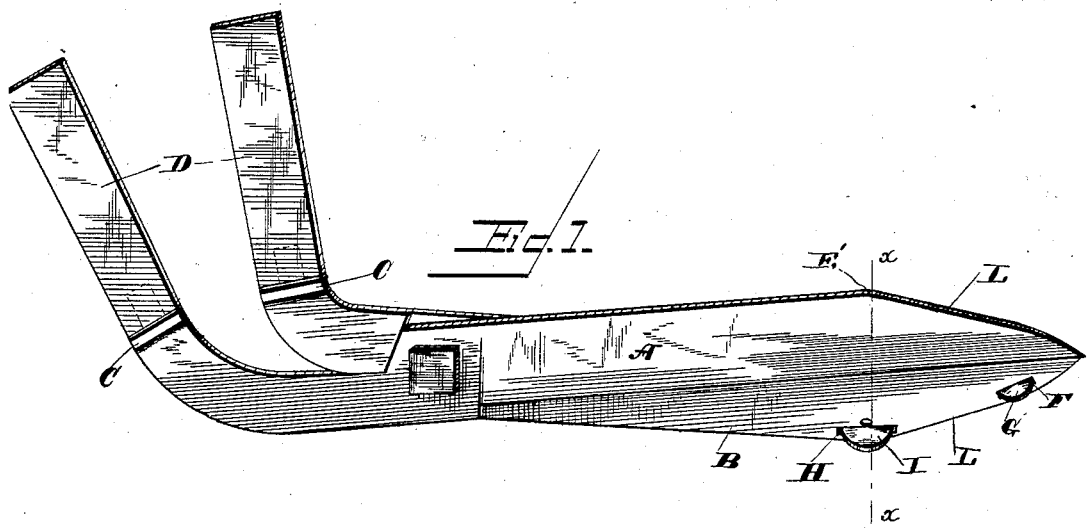
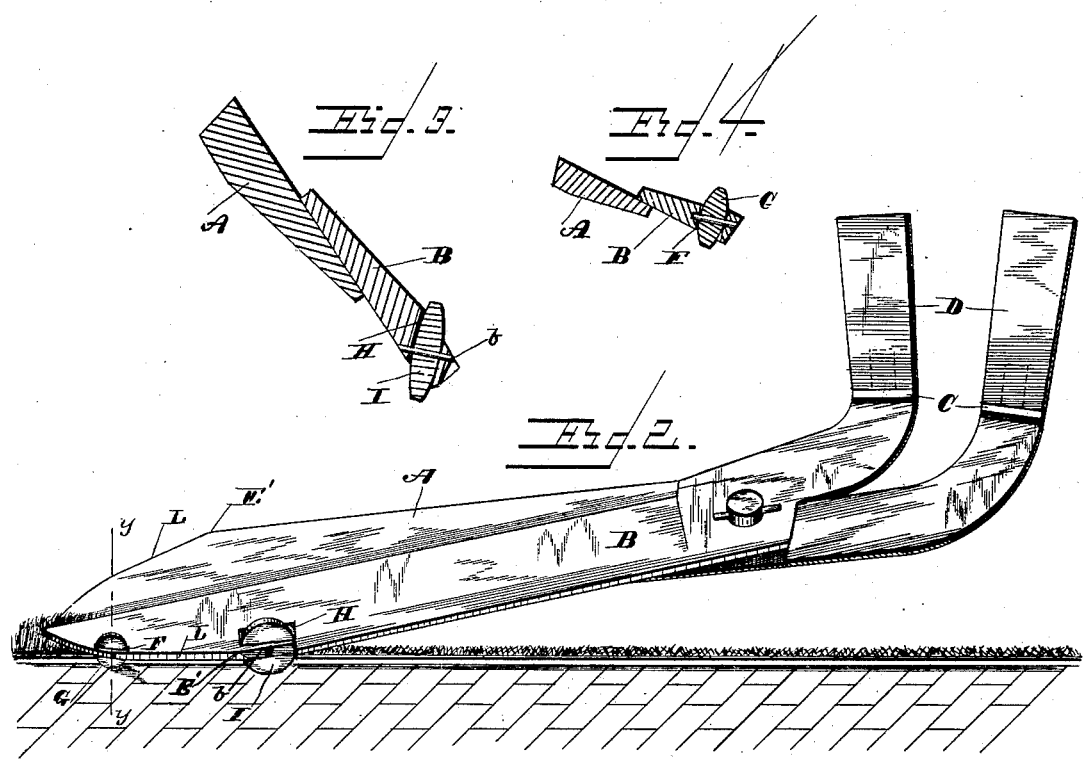
Witnesses
C. E. Doyle.
E. G. Siggers
Inventor
G. M. Naumann
By his Attorneys
C. A. Knowles

UNITED STATES PATENT OFFICE.

GOTTHELF MAX NAUMANN, OF CORNING, NEW YORK.

LAWN-SHEARS.

SPECIFICATION forming part of Letters Patent No. 362,104, dated May 3, 1887.

Application filed December 21, 1886. Serial No. 222,222. (No model.)

*To all whom it may concern:*

Be it known that I, GOTTHELF MAX NAUMANN, a citizen of the United States, residing at Corning, in the county of Steuben and State of New York, have invented a new and useful Improvement in Lawn-Shears, of which the following is a specification.

My invention consists in a new and useful improvement in lawn-shears for trimming the borders of lawns, &c., which will be hereinafter fully described and claimed.

In the accompanying drawings, Figure 1 is a side elevation of my improved shears as adapted to cut tall grass. Fig. 2 is a similar view showing the shears adjusted to cut grass growing unusually close to the walk; and Figs. 3 and 4 are sectional views taken, respectively, on lines $x\ x$ of Fig. 1 and $y\ y$ of Fig. 2, looking toward the rear.

Referring to the drawings, in which similar letters denote corresponding parts in all the figures, A represents the upper, and B the lower blade of the shears, each blade being formed at its rear end with a tang, C, and on these tangs are secured the lower ends of the upwardly-extending handles D D, which are usually about three feet long.

About one inch from the point of the lower blade is inserted and pivoted in a recess, F, formed in the blade at that point, a small wheel or anti-friction roller, G, which projects just far enough below the edge of the blade to run freely on the walk or path when the blades are canted, this wheel lying in a plane nearly perpendicular to the plane of the blade B, as shown.

The lower blade, B, of the shears is provided with another longer slot, H, which is formed longitudinally therein a short distance from the recess or slot F, and at the bend or knee E' of the blade, as shown. The sides of this longer slot are inclined at an obtuse angle to the upper surface of the blade. I represents a friction-roller of greater diameter than the roller G, and the said roller I is journaled in the inclined slot H on a suitable shaft and in an inclined position corresponding to the angle of the said slot and to the general direction of the inclination of the roller G. These rollers G and I are made exceedingly strong and durable, so as to last for years, and by drawing out their pivots they can be easily removed when worn and as readily replaced by new ones. The rear roller, I, also projects sufficiently far below the edge of the blade to run freely on the walk or path.

The lower edge of the blade B, between the rollers G I, is made perfectly straight, as seen at L, to prevent the said lower edge from bearing upon the ground while the shears are in use.

In order to make the shears symmetrical in appearance, the upper edge of the blade A is shaped exactly as the lower edge of the blade B, having the knee E' and the straight portion L.

In operation, the rollers lighten the labor of cutting the grass by greatly reducing the friction of the shears against the walk or path, and also provide for easily cutting grass which has grown very close to the walk or path, and also grass which has grown higher than usual. When grass is to be cut that has grown very close to the path, the rear of the shears is elevated, so that the rear wheel, I, is clear of the ground, the shears thus running on the forward wheel alone and enabling their points to be brought as close to the ground as desired. The shears are also turned over partly on the side to enable the blades to act more directly across the height of the grass. Fig. 4 shows clearly the position which the blades assumed in cutting short grass, and, if it should be desirable to cut still closer to the ground, it is evident that the shears may be still further canted endwise, and thereby throw the points of the blades closer to the ground. When higher grass is to be cut, the point of the shears is elevated, so that the forward wheel, G, is clear of the path, the shears running on the rear wheel, I, alone, thus enabling their points to be elevated as much as desired. It will also be seen by Fig. 3 that the shears are leaned slightly toward the grass to be cut, to enable the blades to cut more directly.

It will be readily understood that the shears of my invention can be canted sidewise and endwise to any desired extent, so that the blades thereof can be caused to cut the grass at different oblique angles. As, for instance, when it is desired to cut grass of considerable height, the shears assume the position shown in Figs.

1 and 3, and when shorter grass is to be cut the shears are canted so that the points and the sides thereof lie closer to the grass, as in Figs. 2 and 4. By thus enabling the shears to be canted both endwise and sidewise, they can be used for trimming grass of varying heights, and in cutting short grass they can be adjusted very close to the ground, and thereby trim or cut the grass very closely. This is a great advantage over the shears now in general use.

The friction-wheels, besides taking up friction and causing the shears to run far easier and lighter, also prevent the gradual wearing off of the point of the shears, which, when they run directly on the ground in the usual manner, will wear off very rapidly, and ultimately render the shears useless.

From the foregoing description, taken in connection with the accompanying drawings, the construction, operation, and advantages of my improved shears will be readily understood.

It will be seen that my improved shears are simple and strong in construction, and by their use three or four times the amount of work can be done that could be accomplished with the ordinary shears, and the result is eminently more satisfactory.

Having thus described my invention, what I claim, and desire to secure to secure by Letters Patent of the United States, is—

1. A lawn-shears comprising the upper and lower blades, the lower blade having two friction-rollers independently journaled therein at intermediate points of its length, each roller being inclined at an angle to the surface of the blade, as and for the purpose described.

2. A lawn-shears comprising the upper and lower blades, the lower blade having two longitudinal slots or recesses, F and H, formed therein at intermediate points of its length, the sides of the slots being inclined at an angle to the surface of the blade, as described, and the friction-rollers G and I, fitted in these slots and journaled on independent shafts, as and for the purpose described.

3. In lawn-shears, two pivoted blades, the lower one of which has the lower edge thereof inclined or beveled at the front end to form the straight edge L, and a knee, E', at the rear end of the straight edge, in combination with friction-rollers, one of which is journaled in the straight edge and the other at or near the knee, as set forth.

In testimony that I claim the foregoing as my own I have hereto affixed my signature in presence of two witnesses.

GOTTHELF MAX NAUMANN.

Witnesses:
HUGH H. KENDALL,
MARVIN OLCOTT.